United States Patent
Stultz et al.

Patent Number: 5,641,401
Date of Patent: Jun. 24, 1997

[54] SLUDGE DEODORIZATION

[75] Inventors: Jeffrey H. Stultz, Freeport; Danford L. Bice, Lake Jackson, both of Tex.

[73] Assignee: The Dow Chemical Company, Midland, Mich.

[21] Appl. No.: 462,038

[22] Filed: Jun. 5, 1995

Related U.S. Application Data

[63] Continuation of Ser. No. 55,157, Apr. 29, 1993, abandoned.

[51] Int. Cl.$^6$ .................................................. C02F 1/20
[52] U.S. Cl. .......................... 210/218; 95/263; 210/718; 210/750; 210/774
[58] Field of Search ................... 210/718, 750, 210/774, 218, 613, 743; 203/89, 49, 39; 95/263

[56] References Cited

U.S. PATENT DOCUMENTS

| | | | |
|---|---|---|---|
| 484,823 | 10/1892 | Scruby. | |
| 800,187 | 9/1905 | Venable. | |
| 2,172,646 | 9/1939 | Walker | 261/112 |
| 2,183,657 | 12/1939 | Page | 210/7 |
| 2,758,875 | 8/1956 | Loveless | 299/69 |
| 2,809,933 | 10/1957 | Halvorson | 210/16 |
| 2,992,986 | 7/1961 | Ingram | 210/17 |
| 3,192,155 | 6/1965 | Bready et al. | 210/705 |
| 3,231,490 | 1/1966 | Fry | 210/17 |
| 3,329,271 | 7/1967 | Ward et al. | 210/150 |
| 3,341,450 | 9/1967 | Ciabattari et al. | 210/63 |
| 3,371,033 | 2/1968 | Simmons et al. | 210/3 |
| 3,468,795 | 9/1969 | Bye-Jorgensen | 210/7 |
| 3,730,881 | 5/1973 | Armstrong | 210/519 |
| 3,953,326 | 4/1976 | Reimann | 210/7 |
| 3,960,717 | 6/1976 | Wyatt | 210/6 |
| 3,981,800 | 9/1976 | Ort | 210/6 |
| 4,017,421 | 4/1977 | Othmer | 252/416 |
| 4,129,502 | 12/1978 | Garrett et al. | 210/60 |
| 4,160,725 | 7/1979 | Josis et al. | 210/21 |
| 4,321,410 | 3/1982 | Ono et al. | 564/67 |
| 4,367,146 | 1/1983 | Pollock et al. | 210/608 |
| 4,421,534 | 12/1983 | Walker | 55/73 |
| 4,541,986 | 9/1985 | Schwab et al. | 422/5 |
| 4,689,156 | 8/1987 | Zibrida | 210/747 |
| 4,735,723 | 4/1988 | Mulder | 210/603 |
| 4,832,848 | 5/1989 | Velebil et al. | 210/617 |
| 4,839,052 | 6/1989 | Maree | 210/603 |
| 4,894,162 | 1/1990 | Cournoyer et al. | 210/603 |
| 5,138,687 | 8/1992 | Dunson, Jr. | 210/916 |
| 5,200,065 | 4/1993 | Sinclair et al. | 210/104 |
| 5,217,624 | 6/1993 | Yamane et al. | 210/751 |
| 5,234,606 | 8/1993 | Kazama et al. | 210/748 |
| 5,234,607 | 8/1993 | Brandenburg et al. | 210/761 |

FOREIGN PATENT DOCUMENTS 2202167  3/1987  United Kingdom .............. 55/53

OTHER PUBLICATIONS

"Texas Operations Wastewater Treatment Plant Dow U.S.A." Mar. 1992.

*Primary Examiner*—Virginia Manoharan

[57] ABSTRACT

Methods for removing e.g. odor-causing components from liquid sludge, and, in one embodiment, a process for sludge deodorization which includes pretreating the sludge to gasify certain components, reducing the size of solids in the sludge, feeding the thus treated sludge tea stripping tower and therein removing in a stripping gas undesirable components from a thin film of the sludge on the interior tower wall. Preferably, the treated sludge is dewatered. Products from the tower may be recycled for further treatment until a desired odor level is achieved or discharged from the process. The process may be batch or batch-wise continuous.

8 Claims, 2 Drawing Sheets

SLUDGE DEODORIZATION

This is continuation of application Ser. No. 08/055,157 filed on Apr. 29, 1993, now abandoned.

BACKGROUND OF THE INTENTION

1. Field of the Invention

This invention is directed to removal of odors and volatile compounds from materials and, in one aspect, to sludge deodorization.

2. Description of Related Art

In treatment of wastewater, sludges are generated by the clarification of incoming wastewater to remove solids that are either inert or are too large to be easily biodegraded. Such solids can cause mechanical problems with downstream equipment. Primary sludges are generally gritty and odorous.

Denatured, primary, digested or secondary sludge consists of excess microbial mass generated as a result of a biological treatment process. Such sludges and dewatered solids have odors and volatile compounds emitting therefrom. These volatile compounds are not only unpleasant, unhygienic, and a source of air pollution, but also present a possible fire hazard.

A variety of previous patents describe various apparatuses and processes. U.S. Pat. No. 4,984,162 describes a method of collecting vented material from vessels containing raw wastewater and volatile compounds that would normally escape to the atmosphere since these vessels normally have an open top. The vented material and air are pumped to an aerobic sludge reactor where the volatile and odorous compounds are destroyed by bacteria in the reactor and remaining biologically inert gas then degasses to the atmosphere.

U.S. Pat. No. 4,966,706 describes adding peracid to a sludge generated in a wastewater treatment plant to kill parthenogenic microorganisms and worm eggs. The peracid treated sludge is then digested in an anaerobic septic tank which generates methane that is burned to produce usable energy. The digested sludge can be used as fertilizer.

British patent application U.K. 2,202,167 describes a process for removing dissolved gasses from a liquid, particularly oxygen from water, using a static mixer and mentions removing volatile compounds from wastewater. The patent describes a separation tank where the gasses separate from the liquid without agitation.

Japanese Patent 53-144463 describes a process for removing gas from water using two ejectors and degassing tanks in series. This is similar to the previous patent except an ejector is used instead of a static mixer. Both devices are similar in that they mix a stripping gas with the liquid.

U.S. Pat. No. 4,160,725 describes a nonbiological steam stripper for removing ammonium and phenolic compounds from coke oven wastewater.

U.S. Pat. No. 4,508,545 describes a system using stripping gasses from wastewater in a packed tower and a gas scrubber so the stripping gas can be recycled.

U.S. Pat. No. 4,655,935 describes a process for detoxifying wastewater from dithiocarbamate manufacturing that includes air stripping the water.

British Patent U.K.2,093,727 describes a method for enhanced thickening of anaerobically digested sludge. The sludge after digestion contains entrained methane. By stripping the sludge with a gas and degassing, the sludge thickens in a gravity settler.

There has long been a need for an effective and efficient method for sludge odor reduction. There has long been a need for apparatuses and methods for effectively handling and devolatilizing a multi-phase amount of halogenated hydrocarbons (e.g. a slug caused by a plant upset). There has long been a need for any of these methods which inhibit or eliminate tower foaming problems.

SUMMARY OF THE PRESENT INVENTION

The present invention, in one aspect, discloses processes and apparatuses for removing volatile and semi-volatile compounds from sludges prior to dewatering and exposing them to the atmosphere during handling. This is achieved in one embodiment primarily for odor reduction and emission control by pumping sludge from a primary clarifier to an agitated sludge holding taxi in which, preferably, an acid is added and the sludge is allowed to degas to a vent treatment system. Alkalinity of the liquid is adjusted if required for downstream corrosion inhibition e.g. by adding sodium hydroxide or caustic to the tank to neutralize the sludge. Then the sludge is pumped to a sludge stripper tower, preferably through a delumping device, shredder, or grinder to insure a large solid surface area for stripping. The sludge enters the stripper tower, preferably, through a nonclogging type spray nozzle with a hollow cone pattern, but any suitable means for sludge distribution on the interior wall may be used. By applying the sludge on the wall of the stripper a thin film of sludge is created providing a large surface area for mass transfer of volatile compounds as vapors to the stripping gas. The flowing sludge provides a washing action on the wall of the stripper to prevent buildup of sludge that could disturb the thin film or cause plugging. Stripping gas is introduced cocurrent or countercurrent to the sludge flow. In one preferred embodiment cocurrent flow downward is provided to inhibit or prevent foaming into a vent treatment system. The stripping gas may be air, nitrogen or any other suitable, and preferably non-objectionable, gas.

The sludge and stripping gas exit the bottom of the tower and enter an agitated sludge holding tank where a vapor including stripping gas laden with absorbed odor causing contaminants (e.g. volatile and semi-volatile compounds) disengages from the liquid sludge and exits to the vent treatment system. In another preferred embodiment the devolatilized sludge is recycled from the holding tank back to the stripper. Processes according to this invention may be either batch or continuous; however, a batch process is presently preferred to minimize equipment staging for acceptable devolatilization, since a batch operation can accomplish in cue vessel what is accomplished in a series of vessels in a continuous process. Devolatilized sludge may be pumped to dewatering equipment. Dewatered sludge may be exposed to the atmosphere without harmful effects.

It is, therefore, an object of at least certain preferred embodiments of the present invention to provide:

New, useful, unique, efficient, non-obvious devices and methods for devolatilization of materials (removal of volatile and/or semi-volatile materials), particularly sludges.

Such methods and devices which may be used in batch or continuous operation with cocurrent or countercurrent sludge flow in a stripping tower;

Such methods and devices which employ a tower according to this invention as described herein; and the tower itself;

Such devices for reducing the odor level of sludge or dewatered solids; and

Such devices and methods which produce a product which may be exposed to the atmosphere without harmful effects.

This invention resides net in any particular individual feature, but in the combinations of them herein disclosed and claimed and it is distinguished from the prior art in these combinations with their structures and functions. There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter at of the claims appended hereto. Those skilled in the art will appreciate that the conceptions, upon which this disclosure is based, may readily be utilized as a basis for the designing of other structures, methods and systems for carrying cut the purposes of the present invention. It is important, therefore, that the claims be regarded as including any legally equivalent constructions insofar that they do not depart from the spirit and scope of the present invention.

The present invention recognizes and addresses the previously mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

So chat the manner in which the above-recited features, advantages and objects of the inventions, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED AT THE TIME OF FILING FOR THIS PATENT

Figure 1:
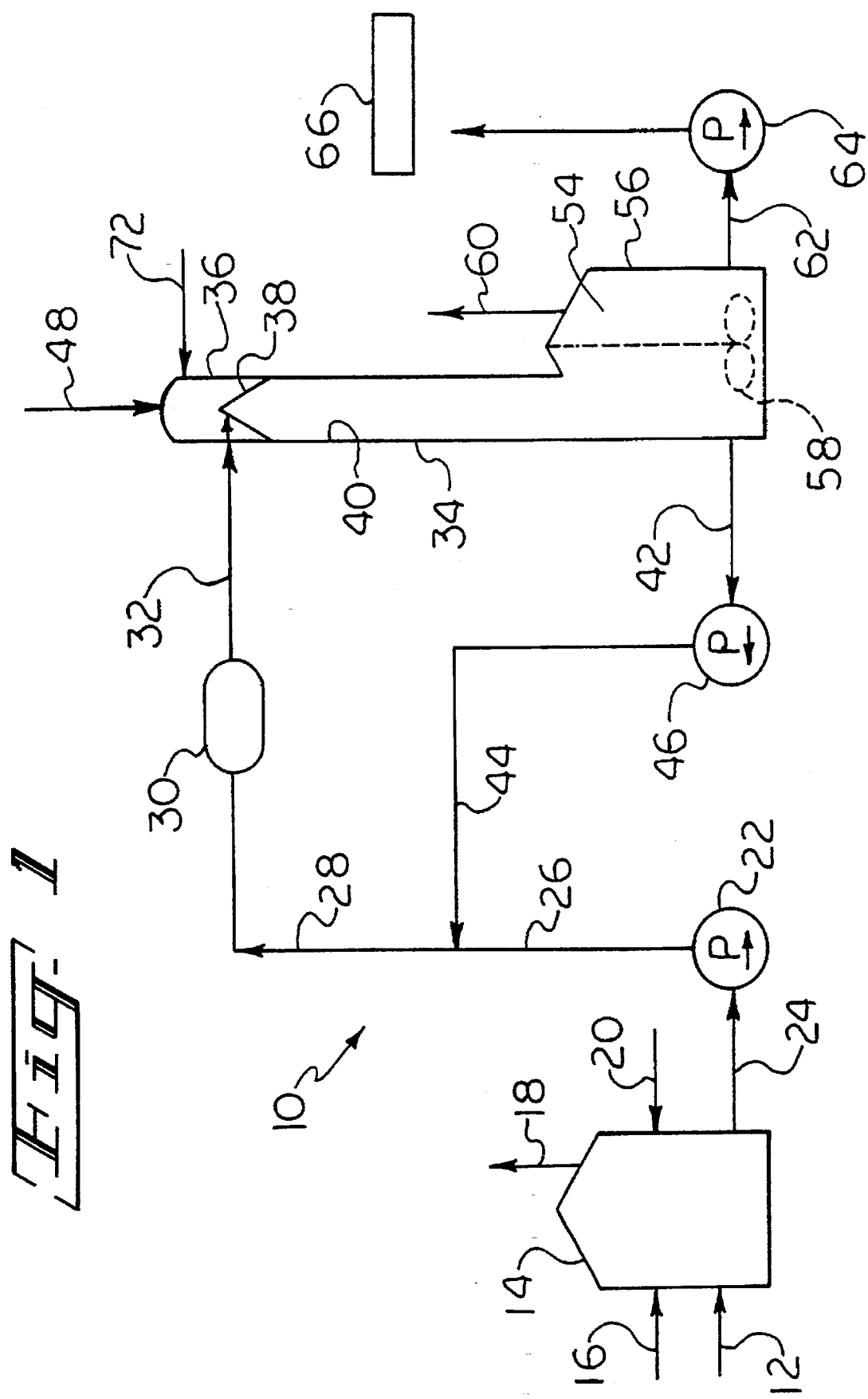
FIG. 1 is a schematic view of a process according to the present invention.

Referring now to FIG. 1, in a process 10 according to the present invention liquid sludge containing odor-causing contaminants such as undesirable volatile and/or semi-volatile material (henceforth "volatile material" or "volatiles") is pumped through a line 12 into a holding tank 14. Preferably, acid, e.g. aqueous hydrochloric acid, is added to the sludge in the tank 14 through a line 16 to facilitate degassing of the sludge, the sludge producing a gas containing volatile material. The gas is vented through a vent line 18, preferably to a treatment apparatus. Preferably, neutralization of the acidified sludge is effected by introducing an alkaline material, e.g. caustic or NaOH, into the tank 14 through a line 20.

A pump 22 pumps the degassed liquid sludge product from the tank 14 through lines 24, 26, and 28 to a optional device 30 for reducing the size of solids in the sludge to facilitate later steps in the process. This size reduction step is optional. The device 30 may be a shredder, grinder or delumper (e.g. a commercially available delumper model 300006 from Disposable Waste Systems, Inc., known as a "Muffin Monster". For example, a sludge may be introduced into the delumper device 30 with a portion of solids ranging in size from about 1" to about 100 microns. Preferably the solids are reduced in size to less than ¼ inch in a largest dimension.

Sludge with sized solids then flows in line 32 to a stripper tower 34. In one embodiment this liquid sludge is pumped at about 150 gallons per minute and has a composition such as:

| Component | Weight Percent |
| --- | --- |
| Water | 91.9 |
| Sodium Chloride | 6.2 |
| Volatile Suspended Solids | 0.2 |
| Fixed Suspended Solids | 1.7 |

Such a sludge also contains about 75 parts per million ammonia and about 200 parts per million volatile and semi-volatile odor-causing compounds such as chlorinated hydrocarbons, hydrogen sulfide, non-chlorinated hydrocarbons, gasoline, methane, butyric acid, mercaptans, etc. Preferably the sludge enters a top 36 of the tower 34 through a non-clogging liquid distributor, e.g. but not limited to a non-clogging hollow cone spray nozzle 38 for applying a liquid sludge film to the tower wall. In one embodiment, such a tower is 2 feet in diameter and a wetted surface 40 about the tower's interior is 20 feet in height. Preferably, via lines 42 and 44 a pump 46 recycles partially stripped and degassed sludge to the tower 34 for further stripping until undesirable materials are removed to a desired level.

Via a line 48 a stripping gas or vapor e.g., air, nitrogen, steam or carbon dioxide is fed into the top 36 of the tower 34, e.g. 300 cubic feet per minute of air. The gas contacts the thin sludge film on the surface 40. Volatiles are transferred from the film to air in the tower. Sludge and air flow dowm the tower 34 into a degassing tank 56 in which the sludge is agitated by one or more rotating impellers 58. Air and gaseous volatiles are vented (preferably to a treatment apparatus such as a vent incinerator) in a line 60 from the tank 56. Sludge is then pumped through a line 62 by a pump 64 to dewatering equipment 66, e.g. batch dewatering equipment such as a filter press. In the embodiment in which about 105 gallons per minute of treated sludge is recycled by the pump 46, about 150 gallons per minute of the treated sludge are pumped to the dewatering equipment.

A process 10 as previously described can be operated in a batch-wise continuous manner by recycling sludge with the pump 46 (in the example above about 140 gallons per minute) from the tank 56 to the stripper tower 34 with no fresh sludge feed into the tower 34 until volatiles are removed to a lower odor level or to an odor free level.

Figure 2:
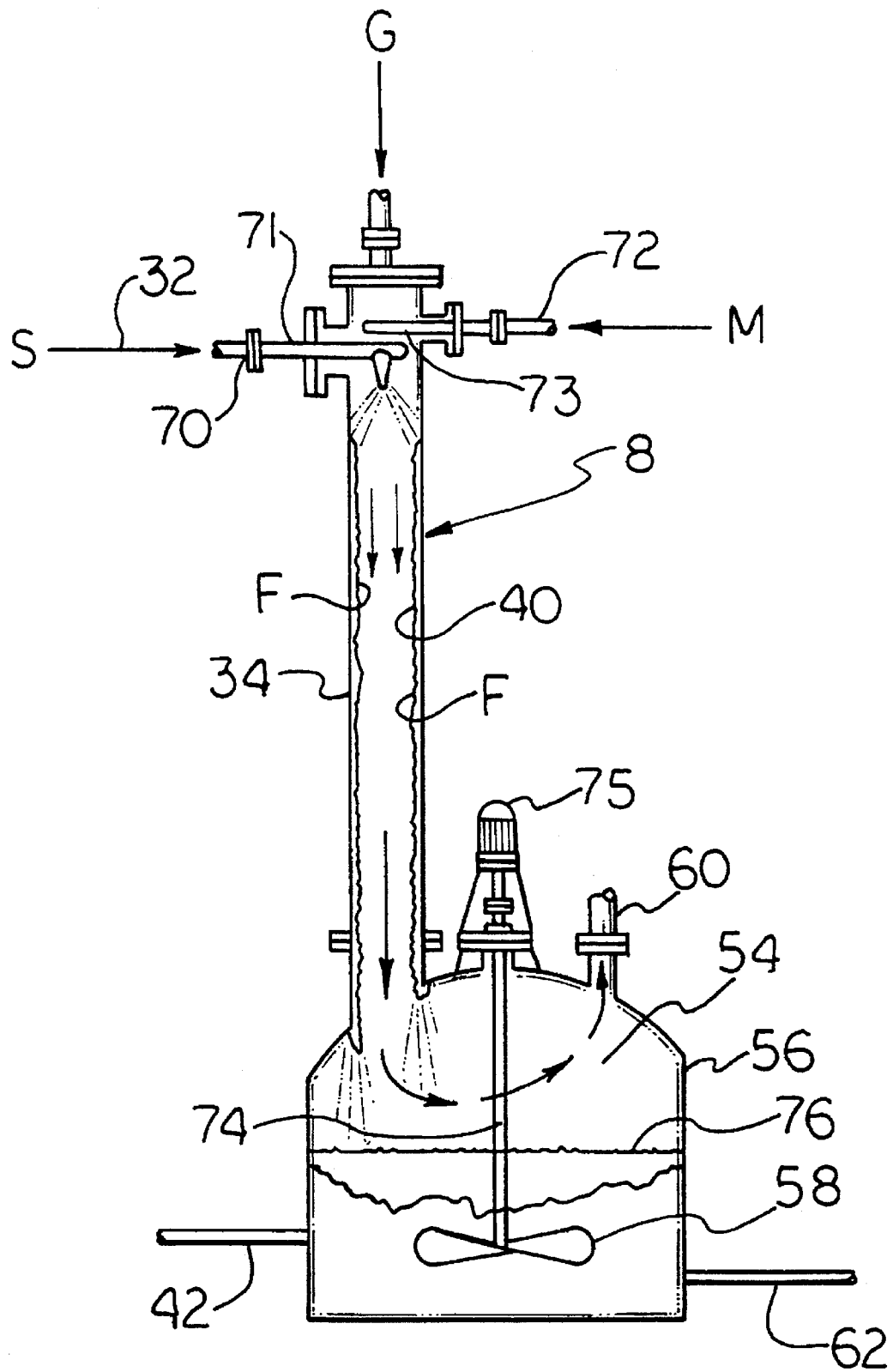
FIG. 2 is a schematic view of a tower useful in a process according to the present invention.

A system 8 as shown in FIG. 2 has a tower 34 (like the tower 34 in FIG. 1) with an inlet 70 into which is fed digested denatured sludge S. The sludge S flows through a pipe 71 to a spray nozzle 38 (like the nozzle 38, FIG. 1). Of course any appropriate water distributor may be used e.g. a weir-type trough with slots in it. The nozzle 38 applies a sludge film F to the interior wall 40 of the tower 34. If desired, steam M may be introduced into the tower 34 at an inlet and through a sparger 72. This steam (e.g. 30 p.s.i.g. saturated steam) is quenched by the liquid sludge which enters the tower at a temperature of about eighty degrees Fahrenheit. The steam may be used to adjust temperature in the tower 34. A preferable range for stripping volatiles in the tower 34 is about 120 degrees Fahrenheit to about 180 degrees Fahrenheit, with about 140 degrees preferred for the particular method shown in FIG. 1 and 2. Stripping gas G, e.g. air, is fed into the tower 34 via the line 48 (see FIG. 1) and flows in a co-current downward flow with the falling sludge film F. Gases, liquids, film and vapors move down into the tank 56 which is agitated by the impeller 58 on a shaft 74 which is rotated by a motor 75. In a gas-liquid disengaging zone 54 in the tank 56, a saturated vapor with the undesired odor-causing volatiles disengages from the liquid sludge and flows upwardly to a vent 60 and cut from the tank 56. A slight vacuum, e.g. of about five to about six inches of water, may be applied to the vent 60 to facilitate flow to and through the vent 60. Preferably, the vented vapor is fed to a treatment apparatus (not shown), but venting to atmosphere is within the scope of this invention. By ceasing to feed any fresh sludge into the tower 34 through the line 26 (see FIG. 1) and by recycling already-stripped sludge via line 42 etc. into line 32, the entire amount of sludge in the system can be continuously batch-wise degassed and stripped over and over until the odor level of the entire batch has been reduced to a desirable level or odor has been eliminated. At this point the resulting sludge can be removed via line 62, e.g. to a filter press or other dewatering equipment. Once the tank 56 is emptied, a new batch of sludge can be fed in. The tank 56 in one embodiment is cylindrical with a diameter of about 12 feet and a height of about 30 feet. It is preferable to obtain and maintain a liquid sludge level 76 of between about 10 and about 15 feet in the tank 56.

In the process described in FIG. 1 and 2 it is preferred that there be no internal devices in the tower below the sludge distributor; that no chemical reactions occur in the tower; that the process be a batch-wise continuous batch recycle process; that high wash rates, e.g. 5000 to 20,000 pounds per hour per foot of tower periphery, be maintained on the interior tower surface so that areas in the tower do not dry out and so solids do not build up on the interior tower surface producing inactive areas for stripping. The use of input steam is optional, but inputting the steam can elevate the partial pressure of volatile materials and result in lower volatile levels in the product for a given vapor rate. It is preferred that the tank be kept at atmospheric pressure or at a relatively low negative pressure so that boiling of materials in the tank need not be dealt with; but it is within the scope of certain embodiments of this invention to maintain pressures in the tank down to a vacuum, so long as there is no excessive boiling of materials in the tank. Processes as described here may be used with slurries to remove undesirable materials, e.g. removal of ethylene dichloride from line slurry; or removal of sulfides from drilling mud.

In one embodiment in a system and method according to this invention a stripper tower 34 has a sludge flow rate of 500 pounds per hour or more of wetted periphery foot of tower periphery with a tower of 2 foot diameter, or about 6.28 square feet per foot of height of filming surface, and most preferably between about 5000 and about 20,000 pounds per hour per foot, thus providing a uniform film with little or no streaking or solids buildup and desirable continuous renewal of the film surface. Recycled degassed sludge (e.g. via line 42) assists in maintaining filming rate within the tower 34 and in batch operations. Preferably recycling ceases when new sludge is being introduced into the tower to maximize stripping efficiency.

It is within the scope of this invention for the stripping gas to enter the tower 34 in either cocurrent or countercurrent flow with respect to the sludge; but cocurrent downward flow is preferred and is believed to result in the inhibition or prevention of foaming in the tower and in the inhibition of gas-entrained sludge from entering the vent line 60. It is preferred that air flow in the line 48 be 1 cubic foot or more per gallon of entering sludge or, most preferably, between about 2 to about 10 cubic feet of air per gallon of entering sludge. It is preferred that stripper gas residence time in the tower be 5 seconds or more and, most preferably, about 10 to about 20 seconds. Higher gas introduction rates, although possible, may be limited by the size of the tank vent and of the area 54.

The degassing tank 56 is, preferably vigorously agitated (e.g. with three impellers 58, 46.3 inches in diameter rotated at 45 rpms) to enhance devolatilization. The tank 56 may be operated at positive pressure, at atmospheric pressure or at a negative pressure.

In certain embodiments the tower and tank operating temperature ranges between about 50 and about 215 degrees Fahrenheit and is most preferably about 100 degrees Fahrenheit.

Sludge reactor tank temperature is usually ambient and in one embodiment is about 90 degrees Fahrenheit at atmospheric pressure and a pH of about 9.5. For carbonate removal $_pH$ is initially about 3 and reneutralization brings it to about 9.5.

Filed on even date herewith are the following applications, co-owned with this application, whose subject matter is hereby disclosed herein and which may be employed with the present invention in a material treatment system:

"Sludge Digestion;" U.S. Ser. No. 08/055,159; J. Stultz, D. Bice;

"Sludge Ammonia Removal;" U.S. Ser. No. 08/055,158; J. Stultz, D. Bice;

"Tank Foundation;" U.S. Ser. No. 08/055,152 J. Stultz;

"Pipe To Concrete Transition;" U.S. Ser. No. 08/055,153; J. Stultz;

"Slab Joint Liquid Stop;" U.S. Ser. No. 08/055,156; J. Stultz;

"Sludge Clarifier Bottom;" U.S. Ser. No. 08/055,161; J. Stultz, H. Rabren;

"Sludge Clarifier Roof;" U.S. Ser. No. 08/055,154; J. Stultz;

"Hopper Liner;" U.S. Ser. No. 08/055,155; J. Stultz;

"Waste Gas Incineration;" U.S. Ser. No. 08/055,160; J. Stultz, D. Bice.

The appended claims are well adapted to carry out the objectives and obtain the ends set forth. Certain changes can be made in the described and in the claimed subject matter without departing from the spirit and the scope of this invention. It is realized that chances are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A method for removing odor causing compounds from a liquid sludge, the sludge containing odor causing compounds and suspended solids, the method comprising degassing the liquid sludge in a degassing tank, venting gasses from the degassing tank which degas from the liquid sludge, adjusting pH of degassed liquid sludge prior to introducing it to a hollow tower, flowing the liquid sludge downwardly in a film on an interior surface of the hollow tower, flowing a stripping gas downwardly past the film thereby stripping odor causing compounds from the liquid sludge and into the flowing stripping gas, introducing steam into the tower and maintaining temperature in the tower between 120 and 180 degrees Fahrenheit by controlling an amount of steam introduced into the tower, flowing the liquid sludge and the stripping gas with stripped odor causing compounds from the tower to a holding tank and agitating its contents, disengaging a vapor with odor causing compounds from contents of the holding tank in a disengaging zone in the holding tank, and venting the vapor from the holding tank through a vent, producing devolatilized liquid sludge in the holding tank.

2. The method of claim 1 further comprising pumping the devolatilized liquid sludge to dewatering equipment, and dewatering the devolatilized liquid sludge.

3. The method of claim 1 wherein the sludge is digested denatured sludge.

4. The method of claim 1 further comprising maintaining stripping gas tower residence time of at least five seconds.

5. A method for removing odor causing compounds from a liquid sludge, the sludge containing odor causing compounds and suspended solids, the method comprising degassing the liquid sludge in a degassing tank, venting gasses from the degassing tank which degas from the liquid sludge, adjusting pH of degassed liquid sludge prior to introducing it to a hollow tower, flowing the liquid sludge downwardly in a film on an interior surface of the hollow tower, flowing a stripping gas downwardly past the film thereby stripping odor causing compounds from the liquid sludge and into the flowing stripping gas, introducing steam into the tower and maintaining temperature in the tower between 120 and 180 degrees Fahrenheit by controlling an amount of steam introduced into the tower, flowing the liquid sludge and the stripping gas with stripped odor causing compounds from the tower to a holding tank and agitating its contents, disengaging a vapor with odor causing compounds from contents of the holding tank in a disengaging zone in the holding tank, venting the vapor from the holding tank through a vent, producing devolatilized liquid sludge in the holding tank, and recycling the devolatilized liquid sludge from the holding tank to the hollow tower for further stripping of odor causing compounds.

6. The method of claim 5 further comprising pumping the devolatilized liquid sludge to dewatering equipment, and dewatering the devolatilized liquid sludge.

7. The method of claim 5 wherein the sludge is digested denatured sludge.

8. The method of claim 5 further comprising maintaining stripping gas tower residence time of at least five seconds.

* * * * *